United States Patent
Peng et al.

(10) Patent No.: US 10,483,753 B2
(45) Date of Patent: Nov. 19, 2019

(54) EMBEDDED BATTERY PROTECTION SYSTEM

(71) Applicants: SHANGHAI SIM-BCD SEMICONDUCTOR MANUFACTURING CO., LTD., Shanghai (CN); BCD SEMICONDUCTOR MANUFACTURING LIMITED, Grand Cayman (KY)

(72) Inventors: Shaohua Peng, Shanghai (CN); Xuguang Zhang, Shanghai (CN)

(73) Assignee: BCD Semiconductor Manufacturing Limited, George Town, Grand Cayman (KY)

( * ) Notice: Subject to any disclaimer, the term of this patent is extended or adjusted under 35 U.S.C. 154(b) by 29 days.

(21) Appl. No.: 15/722,823

(22) Filed: Oct. 2, 2017

(65) Prior Publication Data
US 2018/0026438 A1  Jan. 25, 2018

Related U.S. Application Data

(63) Continuation of application No. PCT/CN2015/075818, filed on Apr. 3, 2015.

(51) Int. Cl.
*H02H 7/18* (2006.01)
*H02J 7/00* (2006.01)
(Continued)

(52) U.S. Cl.
CPC ............ *H02H 7/18* (2013.01); *G06F 1/263* (2013.01); *G06F 1/30* (2013.01); *H02J 7/0031* (2013.01); *H04W 88/02* (2013.01)

(58) Field of Classification Search
CPC ... H02H 7/18; G06F 1/30; G06F 1/263; H02J 7/0031; H04W 88/02
(Continued)

(56) References Cited

U.S. PATENT DOCUMENTS

2005/0017688 A1   1/2005 Stellberger
2005/0017755 A1*  1/2005 Chiang ............ H03K 3/356113
                                              326/81
(Continued)

FOREIGN PATENT DOCUMENTS

CN   101404406   4/2009
CN   201789282   4/2011
(Continued)

OTHER PUBLICATIONS

PCT/CN2015/075818, "International Search Report and Written Opinion", dated Sep. 2, 2015, 9 pages.

*Primary Examiner* — Zeev V Kitov (57) ABSTRACT

A signal processing circuit includes a first circuit coupled between a power terminal and a first ground terminal and a second circuit coupled between the power terminal and a second ground terminal. The signal processing circuit is configured to receive a first signal at a voltage level relative to the first ground terminal and, in response to the first signal, provide a second signal at a voltage level relative to the second ground terminal. The signal processing circuit can be used in a battery protection circuit for a mobile device having an embedded battery. The battery protection circuit is configured with two NMOS transistors to allow the cell phone circuit to switch between the embedded battery and an external power source.

14 Claims, 4 Drawing Sheets

(51) Int. Cl.
  *G06F 1/26* (2006.01)
  *G06F 1/30* (2006.01)
  *H04W 88/02* (2009.01)

(58) Field of Classification Search
  USPC .......................................................... 361/86
  See application file for complete search history.

(56) References Cited

U.S. PATENT DOCUMENTS

| | | | |
|---|---|---|---|
| 2007/0030614 A1 | 2/2007 | Yano et al. | |
| 2008/0278115 A1* | 11/2008 | Huggins | B60L 3/12 |
| | | | 320/134 |
| 2011/0305926 A1* | 12/2011 | Kim | H02J 7/0031 |
| | | | 429/7 |
| 2012/0229189 A1* | 9/2012 | Larsen | H03K 3/356165 |
| | | | 327/333 |

FOREIGN PATENT DOCUMENTS

| | | |
|---|---|---|
| CN | 103795107 | 5/2014 |
| CN | 104348233 | 2/2015 |

* cited by examiner

EMBEDDED BATTERY PROTECTION SYSTEM

CROSS-REFERENCES TO RELATED APPLICATIONS

This application claims priority to and is a continuation of International Patent Application PCT/CN2015/075818, filed on Apr. 3, 2015, entitled "EMBEDDED BATTERY PROTECTION SYSTEM," the contents of which are hereby incorporated by reference in their entirety.

BACKGROUND OF THE INVENTION

Single-cell lithium-ion batteries as a power source are widely used in mobile phones. Lithium-ion batteries are based on chemical energy storage, and the energy density is very large. Therefore, there are inherent safety risks associated with bare lithium batteries, leading to the need for battery protection circuits. A lithium battery protection IC (integrated circuit) needs to have high precision measurement of the voltage value to achieve effective over-voltage protection, under-voltage protection, charge overcurrent protection, short circuit protection, and discharge overcurrent protection, etc.

Embedded cell phone batteries, also known as integrated batteries, have become a prevalent design feature in new phone models today, especially in smartphone models. Proponents of embedded batteries say they allow for smaller, sleeker, more ergonomic phone designs, as well as extended battery life. However, embedded batteries prevent the customers from easily replacing the battery. Embedded batteries also place more demand on the battery protection circuit. For example, these embedded batteries require more accurate and efficient charge and discharge protection. In addition, the battery protection circuit for embedded batteries also needs to provide forced battery shutdown function. For example, when the mobile phone undergoes testing in the factory, the battery protection circuit needs to shut down the embedded battery to allow testing using an external power supply. After the testing is completed, the battery protection circuit reconnects the embedded batter to power the mobile phone.

Figure 1:
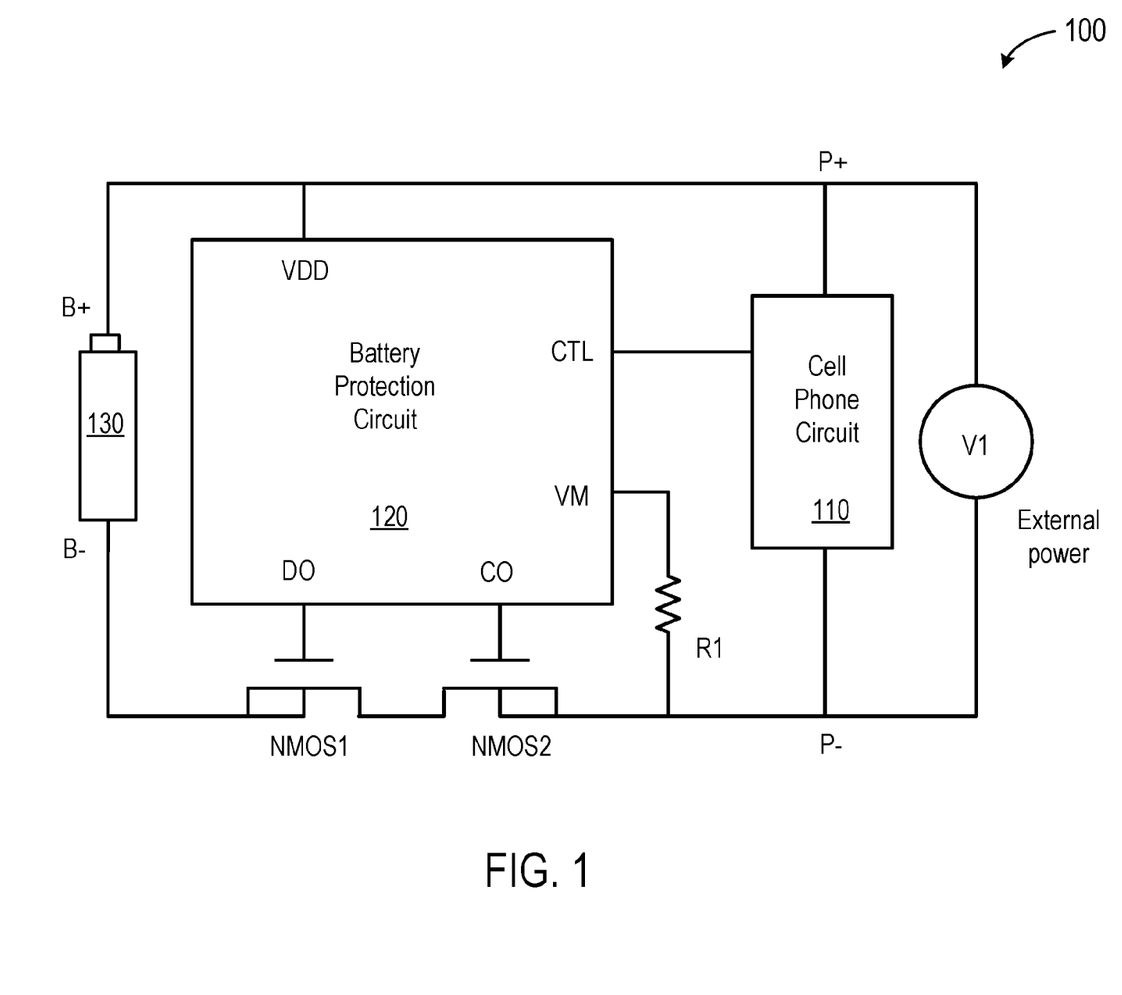
FIG. 1 is a schematic diagram illustrating a cell phone system 100 including a conventional battery protection circuit.

FIG. 1 is a schematic diagram illustrating a cell phone system 100 including a conventional battery protection circuit. As shown in FIG. 1, cell phone system 100 includes a cell phone circuit block 110, a battery protection circuit 120, and NMOS transistors NMOS1 and NMOS2. Cell phone circuit 110 is connected to battery protection circuit 120 and two NMOS transistors NMOS1 and NMOS2. These components are often disposed on a cell phone mother board. System 100 also includes an embedded battery 130 and an external power V1. The external power can come from a test system for functional testing of the cell phone, or from a battery charger for providing power for battery charging. In FIG. 1, battery protection circuit 120 includes terminals VDD, CTL, VM, CO, and DO. VDD is a power input terminal of the battery protection circuit, which is connected to the positive terminal B+ of the battery. In battery protection circuit 120, terminal DO is for providing a discharge control signal to NMOS1, and terminal CO is for providing a charge control signal to NMOS2. Under normal operating conditions, control signals at DO and CO are high, and both NMOS1 and NMOS2 are turned on. As a result, cell phone circuit 110 is connected to embedded battery 130, and the battery can be both charged and discharged. In FIG. 1, P− is a negative terminal of external power V1, and P+ is the positive terminal of the external power. The phone load is connected between P+ and P−. A resistor R1 is connected between terminal VM and P−, and provides current limiting protection. The CTL terminal receives a signal from cell phone circuit 110, e.g., from an input/output (I/O) port of the mobile phone control circuit. The signal at the CTL terminal can vary between a logic high level, e.g., 1.8V and a logic low of the voltage at P−. When the signal at CTL is high, both DO and CO are low; so NMOS1 and NMOS2 are turned off, disconnecting the battery from the phone. At this time, the mobile phone can receive power from the external power source V1 and undergo functional testing. After the test is completed, the CTL is set low, and the DO and CO terminals are restored to high. At this time, NMOS1 and NMOS2 are turned on, and the battery is reconnected to the mobile phone to provide operating power.

The inventors have observed a flaw in the protection method in system 100. Generally, battery protection circuit 120 uses the B− terminal of the battery as a ground reference. On the other hand, the signal provided to the CTL terminal by cell phone circuit 110 uses the P− terminal as a ground reference. During testing, NMOS1 and NMOS2 are turned off, and the two ground terminals B− and P− are isolated from each other. The P− terminal is connected to the external power source, but the B− terminal may be electrically floating relative to P−. When the cell phone circuit attempts to turn on NMOS1 and NMOS2 by setting the signal at CTL to low relative to terminal P−, the protection circuit may not be able to recognize the CTL signal being low, and may fail to turn on NMOS1 and NMOS2 to restore the normal operation.

Figure 2:
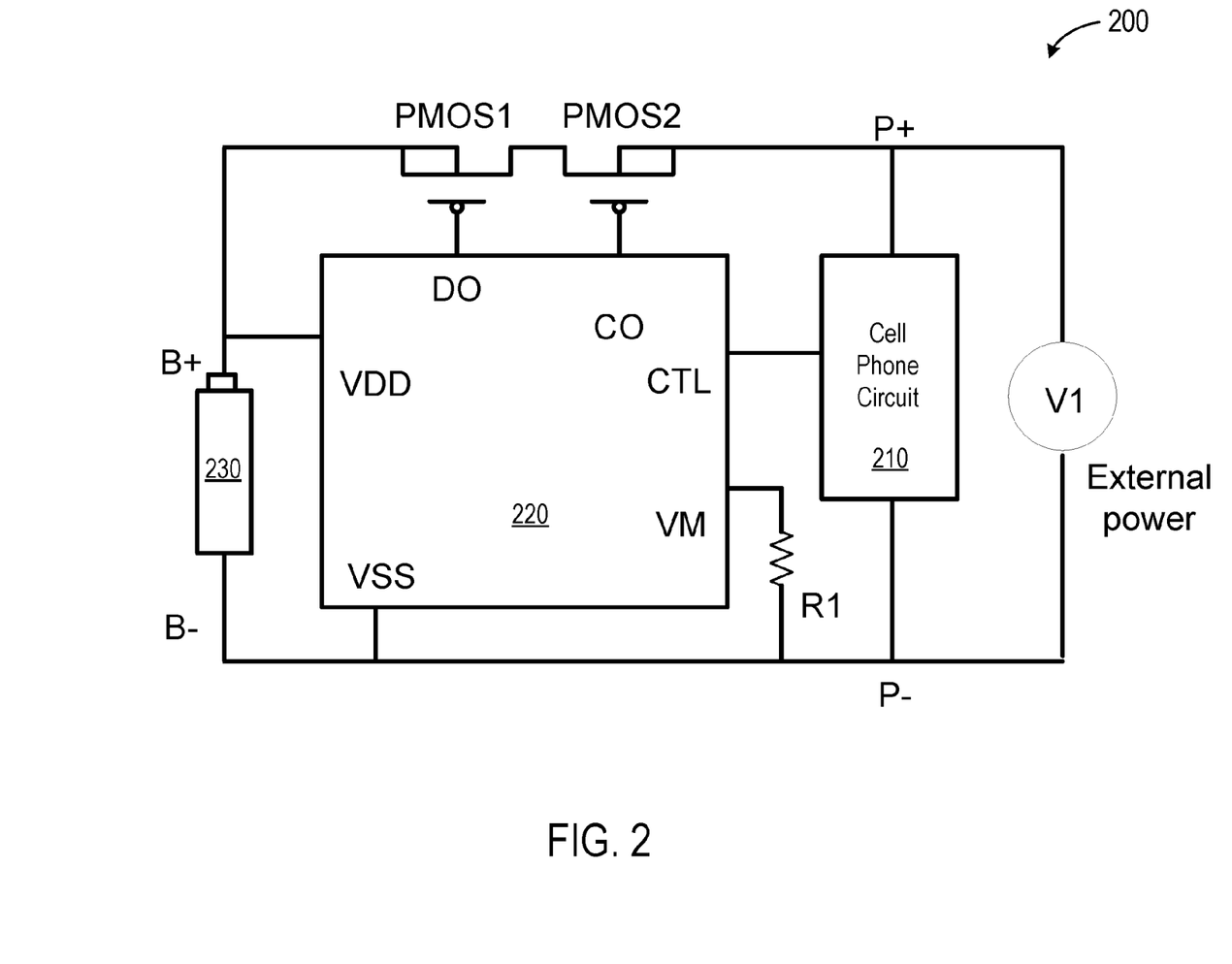
FIG. 2 is a schematic diagram illustrating a mobile device system 200 including another conventional battery protection circuit.

FIG. 2 is a schematic diagram illustrating a mobile device system 200 including another conventional battery protection circuit. As shown, system 200 is similar to system 100 in FIG. 1, including a cell phone circuit 210, a battery protection circuit 220, an embedded battery 230, and an external power source V1. However, the charging and discharging protection NMOS transistors in FIG. 1 are replaced by PMOS transistors in system 200 in FIG. 2. PMOS transistors PMOS1 and PMOS2 are connected in series between the positive terminal B+ of the battery and the positive terminal P+ of the cell phone circuit. The negative terminal B− of the embedded battery and the negative terminal P− of the external power are directly shorted, maintaining a common ground. Because of the common ground, when the signal at CTL is high, the battery protection circuit can accurately identify this high state and set the signals at DO to CO to high, which turns off PMOS1 and PMOS2 and disconnects the battery and the phone. Under this condition, the phone can directly receive power from the external power supply V1 during functional testing. When external power V1 is removed and the signal at CTL is low relative to P−, it is also low relative to B−, because of the common ground. The battery protection circuit sets DO and CO to low and turns on PMOS1 and PMOS2. Under this condition, the mobile phone is powered by the embedded battery for normal operation.

The battery protection method illustrated in FIG. 2 appears to resolve the floating ground problems depicted in FIG. 1. However, the inventors have identified limitations associated with method illustrated in FIG. 2. PMOS1 and PMOS2 are also used for the battery to provide power to the cell phone and for charging the battery from a charger. To satisfy the increasing demand for fast charging operation in a cell phone, the on-resistances Rds from the charging and discharging protection transistors must be kept low, e.g., 15 mΩ or low. Because of the inherent low mobility of PMOS transistors, substantially larger PMOS transistors must be used to implement the solution in FIG. 2 to obtain low on-resistances compared with FIG. 1, which uses NMOS transistors. For example, the battery protection circuit is usually implemented as an integrated circuit and the protection transistors are usually implemented as discrete high-voltage transistors. Because of their large size, the PMOS transistors are not suited for thin mobile phones which require small dimension IC packages. The larger PMOS transistors are also more costly than the NMOS transistors.

Therefore, there is a need for improved battery protection methods for mobile devices in small packages.

BRIEF SUMMARY OF THE INVENTION

As described above, conventional battery protection circuits for cell phone embedded batteries can suffer from problems caused by an electrically floating ground terminal when the power source is switched from an external power to an embedded battery. An example is described above with a cell phone having an embedded battery, and a switch device having two NMOS transistors connecting the ground of the battery to the ground terminal of the cell phone.

This invention teaches a signal processing circuit that includes a first circuit coupled between a power terminal and a first ground terminal and a second circuit coupled between the power terminal and a second ground terminal. The signal processing circuit is configured to receive a first signal at a voltage level relative to the first ground terminal and, in response to the first signal, provide a second signal at a voltage level relative to the second ground terminal.

In some embodiments of the above signal processing circuit, the first circuit is configured to receive an input signal having a voltage level relative to the first ground terminal and to provide first and second complementary digital signals in response to the input signal. The second circuit is configured to provide a digital output signal relative to the second ground terminal in response to the first and second complementary digital signals. In an embodiment, the first circuit includes an input stage having an enhancement-mode NMOS transistor and a depletion-mode NMOS transistor coupled in series at a first internal node between the power terminal and the first ground terminal, in which a gate of the enhancement-mode NMOS transistor is configured to receive the input signal. The first circuit also includes a Schmitt trigger coupled to the input stage at the first node, and an inverter circuit coupled to an output of the Schmitt trigger to provide the first and second complementary digital signals. In an embodiment, the second circuit includes a first PMOS transistor and a first NMOS transistor coupled in series between the power terminal and the second ground terminal, and a second PMOS transistor and a second NMOS transistor coupled in series between the power terminal and the first ground terminal. In the second circuit the first and second NMOS transistors are cross-coupled at the gate and drain terminals. In the second circuit, the first and the second PMOS transistors are configured to receive the first and second complementary digital signals from the first circuit. A node between the second PMOS transistor and the second NMOS transistor is configured to provide the digital output signal relative to the second ground terminal.

This invention also teaches a control circuit that includes a power terminal, first and second ground terminals, a signal processing circuit, and a logic circuit. The signal processing circuit includes a first circuit coupled between the power terminal and the first ground terminal and a second circuit coupled between the power terminal and the second ground terminal. The signal processing circuit is configured to receive a first control signal at a voltage level relative to the first ground terminal and, in response to the first control signal, provide a second control signal at a voltage level relative to the second ground terminal. The logic circuit is coupled between the power terminal and the second ground terminal. The logic circuit is configured to receive the second control signal and to provide a third control signal at a voltage level relative to the second ground terminal in response to the second control signal. In an embodiment, the third control signal is configured to turn on a switch device between the first ground terminal to the second ground terminal to connect the first ground terminal to the second ground terminal, when the switch device is off and the second ground terminal is electrically floating relative to the first ground terminal.

Some embodiments of the invention teach a battery control circuit for a mobile device having an embedded battery and is configured for coupling to an external power source. The battery control circuit includes first and second high-voltage NMOS transistors coupled in series and configured for connecting between a ground terminal of the embedded battery in the mobile device and a ground terminal of the external power source. The battery control circuit also includes a battery protection IC (integrated circuit) that includes a power terminal for coupling to a power terminal of the embedded battery and a power terminal of the external power supply, a first ground terminal for coupling to the ground terminal of the external power source, and a second ground terminal for coupling to the ground terminal of the embedded battery. The battery protection IC is configured to receive a signal from a functional block in the mobile device, and the signal has a voltage level relative to the ground terminal of the external power source. Further, in response to the signal, the battery protection IC is configured to provide one or more control signals having voltage levels relative to the ground terminal of the embedded battery. The control signals are configured to turn on the first and the second high-voltage NMOS transistors to connect the embedded battery to the functional block in the mobile device, or to turn off the first and the second high-voltage NMOS transistors to disconnect the embedded battery from the functional block in the mobile device.

In some embodiments, the battery protection IC includes a signal processing circuit configured to receive an input signal having a voltage level relative to the first ground terminal and to provide an output signal having a voltage level relative to the second ground terminal in response to the input signal. The battery protection IC also includes a logic circuit coupled to the signal processing circuit and configured to provide one or more control signals having voltage levels relative to the second ground terminal in response to the output signal of the signal processing circuit.

A further understanding of the nature and advantages of the present invention may be realized by reference to the remaining portions of the specification and the drawings.

DETAILED DESCRIPTION OF THE INVENTION

This invention teaches a signal processing circuit that includes a first circuit coupled between a power terminal and a first ground terminal and a second circuit coupled between the power terminal and a second ground terminal. The signal processing circuit is configured to receive a first signal at a voltage level relative to the first ground terminal and, in response to the first signal, provide a second signal at a voltage level relative to the second ground terminal. The signal processing circuit can be used in a battery protection circuit for a mobile device having an embedded battery. The battery protection circuit is configured with two NMOS transistors to allow the cell phone circuit to switch between the embedded battery and an external power source. In embodiments of the present invention, the signal processing circuit is configured to maintain the magnitude of the control signal to enable the battery protection circuit to properly interpret the high or low voltages of the control signal provided by the mobile device to connect or disconnect the embedded battery.

Figure 3:
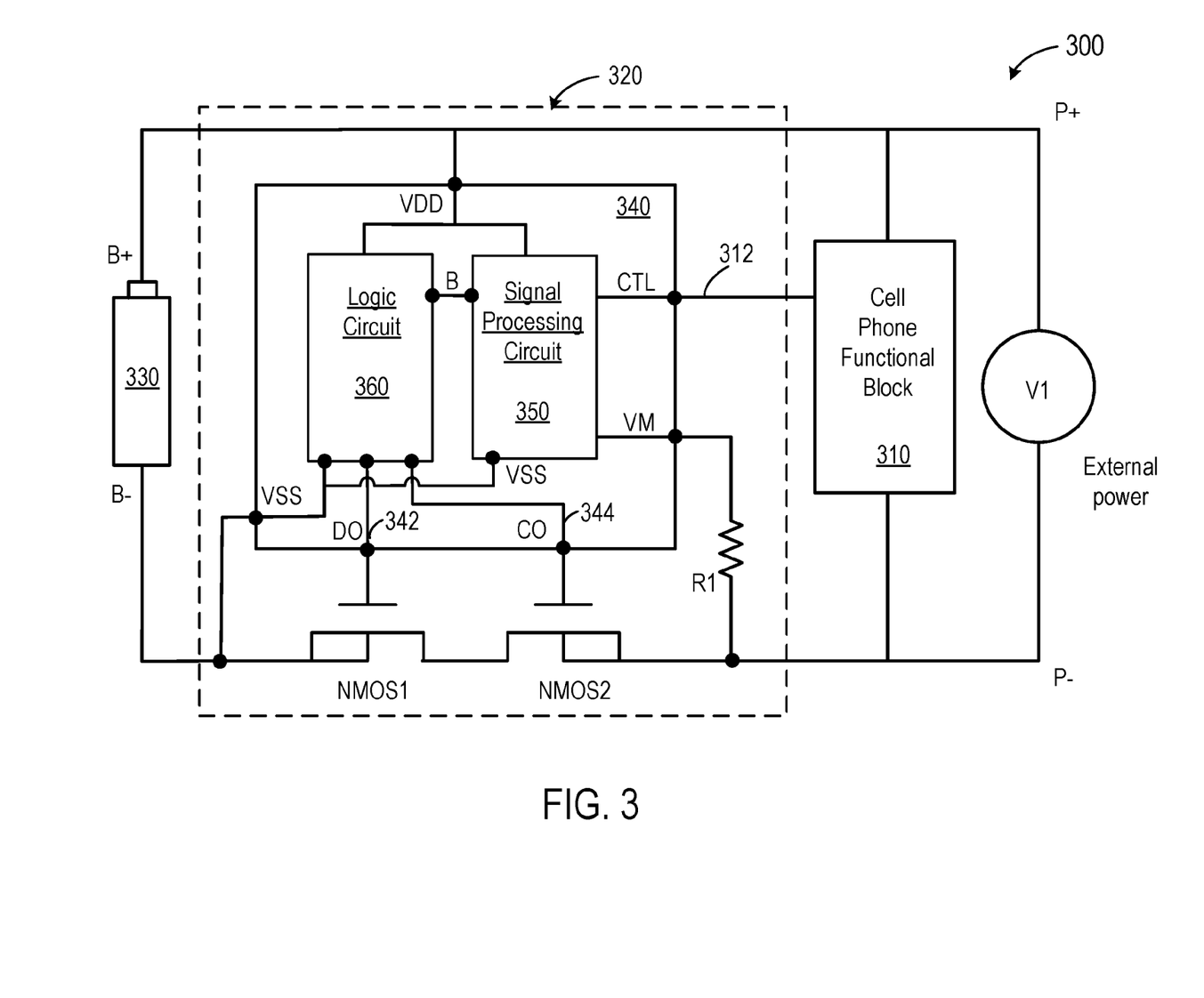
FIG. 3 is a schematic diagram illustrating a mobile device 300 including an embedded battery protection circuit according to an embodiment of the present invention.

FIG. 3 is a schematic diagram illustrating a mobile device 300 including an embedded battery protection method according to an embodiment of the present invention. It is understood that the embedded battery protection method can be applied to different mobile devices having an embedded battery, such as cell phones, personal digital assistants, tablets, and laptop computers, etc. In FIG. 3, a cell phone 300 is illustrated as an example. The cell phone and includes a cell phone functional block 310, a battery control circuit 320, and an embedded battery 330. The cell phone is also configured for coupling to an external power source V1. Battery control circuit 320 includes first and second high-voltage NMOS transistors NMOS1 and NMOS2 coupled in series and configured for connecting between a ground terminal B− of the embedded battery in the mobile device and a ground terminal P− of the cell phone functional block and the external power source. Battery control circuit 320 also includes a battery protection IC (integrated circuit) 340 that includes a power terminal VDD for coupling to a power terminal B+ of the embedded battery and a power terminal P+ of the cell phone functional block and the external power supply. Battery protection IC 340 also has a first ground terminal VM for coupling to the ground terminal P− of the external power source, and a second ground terminal VSS for coupling to the ground terminal B− of the embedded battery. Battery protection IC 340 is configured to receive a signal 312 from functional block 310 in the mobile device, and signal 312 has a voltage level relative to ground terminal P− of the external power source. Further, in response to signal 312, battery protection IC 340 is configured to provide one or more control signals, e.g., 342 and 344, having voltage levels relative to the ground terminal B− of the embedded battery. The control signals are configured to turn on the first and the second high-voltage NMOS transistors NMOS1 and NMOS2 to connect embedded battery 330 to the cell phone functional block 310, or to turn off the first and the second high-voltage NMOS transistors to disconnect the embedded battery from the cell phone functional block.

As shown in FIG. 3, the battery protection IC includes a signal processing circuit 350 configured to receive an input signal having a voltage level relative to the first ground terminal VM and to provide an output signal at node B having a voltage level relative to the second ground terminal VSS in response to the input signal. The battery protection IC also includes a logic circuit 360 coupled to the signal processing circuit and configured to provide one or more control signals, e.g., 342 and 344, having voltage levels relative to the second ground terminal VSS in response to the output signal of the signal processing circuit.

In system 300, cell phone functional block 310, battery control circuit 320, and embedded battery 330 can be disposed on a mobile device mother board. The external power V1 can be provided from a tester for testing the mobile phone during the production process. The external power V1 can also be a battery charger for providing power for battery charging. In FIG. 3, battery protection integrated circuit 340 includes terminals VDD, CTL, VM, CO, and DO. VDD is the power input terminal of the battery protection circuit, which is connected to the positive terminal B+ of the battery during normal operation of the mobile device. P− is a negative terminal of the external power source V1, and P+ is the positive terminal of the external power source. The phone load is connected between P+ and P− during testing or battery charging. NMOS1 is a transistor for discharge protection, and has its source and substrate terminals tied to the ground terminal of the battery. NMOS2 is a transistor for charging protection, and has its source and substrate terminals tied to the ground terminal of the external power source. In battery protection IC 340, signal 342 at terminal DO is for providing a discharge control signal, and signal 344 terminal CO is for providing a charge control signal. Under normal operating conditions, control signals at DO and CO are high, and both NMOS1 and NMOS2 are turned on. As a result, cell phone functional block 310 is connected to embedded battery 330, and the battery can be both charged or discharged and provide power to the cell phone. During normal operation, battery 330 provides power to the cell phone. If an abnormal condition, e.g., an over current, over voltage, or under voltage condition, etc., occurs, signal 344 at the CO terminal turns off NMOS2 and stops the operation. During charging, the external power source V1 provides power to battery 330 and the cell phone circuits. If an abnormal condition, e.g., an over current condition, occurs, signal 342 at the DO terminal turns off NMOS1 and stops the operation. A resistor R1 is connected between terminal VM and P−, and provides current limiting protection. The resistance value of R1 is selected such that R1 sustains only a small voltage drop, and the voltages at VM and P− are substantially the same. In one exemplary embodiment, R1 may have a resistance of 1 KΩ.

In FIG. 3, the CTL terminal receives a signal 312 from an input/output (I/O) port of the mobile phone functional block 310, e.g., an MCU (microcontroller). The signal at the CTL terminal is a logic signal relative to ground terminal P−, and can vary between, e.g., a high of VDD at 1.8V and a low of the voltage at P−. In this embodiment, battery control circuit 340 is configured such that when signal 312 at CTL is high, both signals at DO and CO are low, and NMOS1 and NMOS2 are turned off, disconnecting the battery from the cell phone circuit. At this time, the mobile phone can receive power from the external power source V1 and, for example, undergo functional testing. After the test is completed, CTL is set to low, and signals at the DO and CO terminals are restored to high. At this time, NMOS1 and NMOS2 are turned on, and the battery provides power to the mobile phone for normal operation. Generally, battery protection IC 340 uses the B− terminal of the battery as a ground reference, and the signals are defined relative to the B− terminal. On the other hand, during testing, the signal 312 provided to the CTL terminal by the cell phone functional block 310 is set relative to the P− terminal as a ground reference. During testing, when the signal at CTL is high, both NMOS1 and NMOS2 are turned off, and the two ground terminals B− and P− are isolated from each other. When the signal at CTL is set to low relative to the P− ground terminal, battery protection 340 is configured to recognize the CTL low relative to the P− ground terminal, even though battery protection 340 is configured to operate with respect to ground terminal B−. Battery protection 340 is configured to provide appropriate control signals at DO and CO relative to the B− ground terminal to turn on NMOS1 and NMOS2 to connect battery 330 to the cell phone circuit to resume normal operation.

Figure 4:
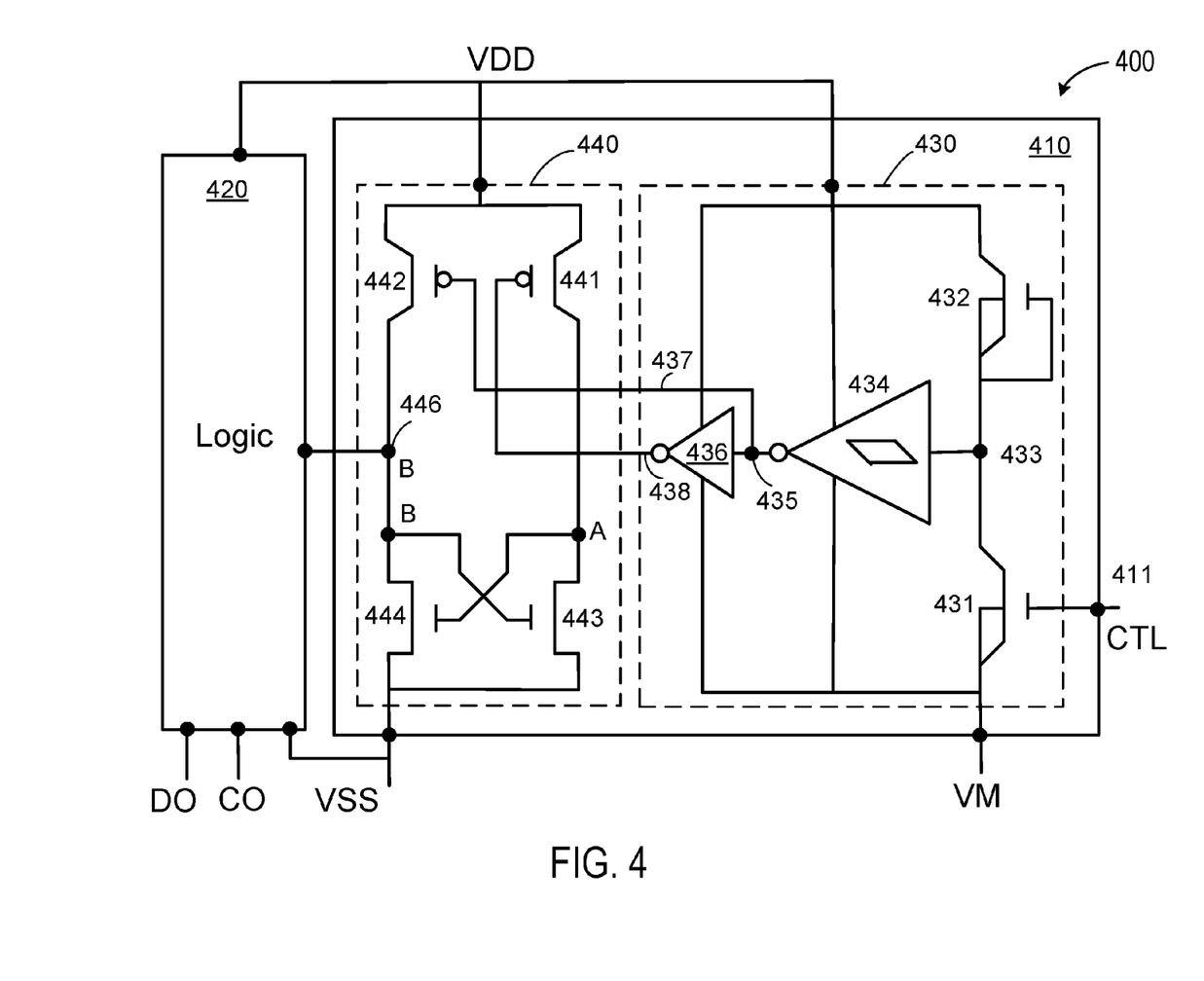
FIG. 4 is a simplified circuit and block diagram of an embedded battery protection circuit according to an embodiment of the present invention.

FIG. 4 is a simplified circuit and block diagram of an embedded battery protection circuit according to an embodiment of the present invention. As shown in FIG. 4, battery protection circuit 400 includes a signal processing circuit 410 and a logic circuit 420, which are exemplary circuits that can be used as signal processing circuit 310 and logic circuit 320 in battery protection IC 340 illustrated in FIG. 3. The invention teaches a signal processing circuit that includes a first circuit coupled between a power terminal and a first ground terminal and a second circuit coupled between the power terminal and a second ground terminal. The signal processing circuit is configured to receive a first signal at a voltage level relative to the first ground terminal and, in response to the first control signal, provide a second control signal at a voltage level relative to the second ground terminal. The logic circuit is coupled between the power terminal and the second ground terminal. The logic circuit is configured to receive the second control signal and to provide one or more control signals at voltage levels relative to the second ground terminal in response to the second control signal. In an embodiment, the one or more control signals are configured to turn on a switch device to connect the first ground terminal to the second ground terminal, even when the switch device is off and the second ground terminal is electrically floating relative to the first ground terminal.

In the embodiment shown in FIG. 4, signal processing circuit 410 includes a first bi-stable circuit 430 coupled between a power terminal VDD and a first ground terminal VM. The first circuit 430 is configured to receive an input signal 411 at node CTL, which has a voltage level relative to the first ground terminal VM, and to provide first and second complementary digital signals 437 and 438 in response to input signal 411. Signal processing circuit 410 also includes a second bi-stable circuit 440 coupled between the power terminal VDD and a second ground terminal VSS. The second circuit 440 is configured to provide a digital output signal 446 relative to the second ground terminal VSS in response to the first and second complementary digital signals 437 and 438.

The first circuit 430 includes an input stage having an enhancement-mode NMOS transistor 431 and a depletion-mode NMOS transistor 432 coupled in series at a first internal node 433 between the power terminal VDD and the first ground terminal VM. The drain terminal of NMOS transistor 431 is connected to the source terminal of NMOS transistor 432 at node 433. The source terminal of NMOS transistor 431 is connected to a ground terminal VM. The gate terminal and source terminal of NMOS transistor 432 are shorted to form a current source as a load device. The gate of the enhancement-mode NMOS transistor 431 is configured to receive input signal 411. The first circuit 430 also includes a Schmitt trigger 434 coupled to the input stage at the first node 433 and configured to provide the first of two complementary digital signals 437 at its output 435. Further, an inverter circuit 436 is coupled to output 435 of the Schmitt trigger to provide the second of two complementary digital signals 438. As is known in the electronics art, a Schmitt trigger is a comparator circuit with hysteresis and two thresholds. For example, when the input is higher than a first chosen threshold, the output is low. When the input is below a second (lower) chosen threshold, the output is high. When the input is between the two levels, the output retains its value. In this embodiment, Schmitt trigger 412 is used to reduce the effect of noise in the input signal at CTL which may be caused by transient or instability conditions.

The second circuit 440 includes a first PMOS transistor 441 and a first NMOS transistor 443 coupled in series between the power terminal VDD and the second ground terminal VSS. The second circuit 440 also includes a second PMOS transistor 442 and a second NMOS transistor 444 coupled in series between the power terminal VDD and the second ground terminal VSS. The source terminals of NMOS transistors 443 and 444 are connected to ground terminal VSS. The source terminals of PMOS transistors 441 and 442 are connected to power supply terminal VDD. The drain terminals of PMOS transistors 441 and 442 are connected to the drain terminals of NMOS transistors 443 and 444 at nodes A and B, respectively. First and second NMOS transistors 443 and 444 are cross-coupled, with gate terminals coupled to respective drain terminals at nodes A and B, respectively to form a bi-stable circuit. First and the second PMOS transistors 441 and 442 are configured to receive the second and first complementary digital signals 438 and 437, respectively, from the first circuit 430. A node B between the second PMOS transistor 442 and the second NMOS transistor 444 is configured to provide the digital output signal 446 relative to the second ground terminal VSS.

When the signal 411 at CTL is high relative to ground VM, NMOS transistor 431 is turned on, and the drain of NMOS transistor 431 is low. Schmitt trigger 434, which is coupled to the drain of NMOS transistor 431 at node 433, is also low, and the output signal 437 of the Schmitt trigger is high, turning off PMOS transistor 442. The output signal 438 of inverter 436 is low, turning on PMOS transistor 441, pulling node A to high to turn on NMOS transistor 444. As a result, node B is pulled low, turning off NMOS transistor 443. The voltage at node B is now low, relative to ground terminal VSS. When the signal at CTL is low relative to ground VM, NMOS transistor 431 is turned off, and the drain 433 of NMOS transistor 431 is high. As a result, the output 437 of Schmitt trigger 434 is also low, turning on PMOS transistor 442. The output signal 438 of inverter 436 is high, turning off PMOS transistor 441. As a result, NMOS transistor 443 is on and NMOS transistor 444 is off. The voltage at node B is now high, relative to VSS.

As described above, signal processing circuit 410 is configured to receive a first control signal 411 at a voltage level relative to a first ground terminal VM and, in response to the first control signal, provide a second control signal 446 at a voltage level relative to the second ground terminal VSS, even when the first ground terminal and the second ground terminal are electrically disconnected from each other and may not be at the same electrical potential.

In FIG. 4, logic circuit 420 is coupled between the power terminal VCC and the second ground terminal VSS and is configured to provide one or more control signals in response to the input signal received at the CTL node of signal processing circuit 410. In an embodiment, the one or more control signals are configured to turn on a switch device to connect the first ground terminal to the second ground terminal, even when the switch device is off and the second ground terminal is electrically floating relative to the first ground terminal When the signal at CTL is high relative to ground VM, logic circuit 420 receives the low signal 446 at node B and provides output signals DO and CO, which can be used to turn off NMOS1 and NMOS2 as shown in FIG. 3. In this example, the switch device mentioned above can include two NMOS transistors. As a result, ground terminals VM and VSS are isolated, and ground terminals B− and P− are isolated. The embedded battery is now disconnected from the mobile device. When the signal at CTL is low relative to ground VM, logic circuit 420 receives a high signal at node B and provides output signals DO and CO, which can be used to turn on NMOS1 and NMOS2 as shown in FIG. 3. As a result, ground terminals VM and VSS are connected, and ground terminals B− and P− are connected. The embedded battery is now connected to the mobile device, and the mobile device now resumes normal operation using the power provided by the embedded battery.

In embodiments of the invention, the mobile device can operate with a battery charger providing a voltage drop of 30 V or higher between terminals Vdd and VM. Therefore, high-voltage devices are used in certain parts of the battery control circuit. As used herein, high-voltage devices refer to devices, e.g., transistors, that are configured to operate with a voltage of 30 V or higher. Similarly, as used herein, low-voltage devices refer to devices configured to operate with a voltage level of the associated logic circuits, e.g., 5 V, 3.3 V, or lower. In the example described above, transistors 431, 432, 441, 442, Schmitt trigger 434, and inverter 436 all are high-voltage devices.

The above description includes specific examples used to illustrate various embodiments. It is understood, however, that the examples and embodiments described herein are for illustrative purposes only. Various modifications or changes in light thereof will be suggested to persons skilled in the art and are to be included within the spirit and purview of this invention.

What is claimed is:

1. A battery control circuit for a mobile device, wherein the mobile device has an embedded battery and is configured for coupling to an external power source, the battery control circuit comprising:

first and second high-voltage NMOS transistors coupled in series and configured for connecting between a ground terminal of the embedded battery in the mobile device and a ground terminal of the external power source; and a battery protection IC (integrated circuit) including:
a power terminal for coupling to a power terminal of the embedded battery and a power terminal of the external power source;
a first ground terminal for coupling to the ground terminal of the external power source; and
a second ground terminal for coupling to the ground terminal of the embedded battery;

wherein the battery protection IC is configured to:
receive a signal from a functional block in the mobile device, the signal having a voltage level relative to the ground terminal of the external power source; and in response to the signal, provide one or more control signals having voltage levels relative to the ground terminal of the embedded battery, the control signals being configured to turn on the first and the second high-voltage NMOS transistors to connect the embedded battery to the external power source, or to turn off the first and the second high-voltage NMOS transistors to disconnect the embedded battery from the external power source;

wherein the battery protection IC comprises:
a signal processing circuit configured to receive an input signal having a voltage level relative to the first ground terminal and to provide an output signal having a voltage level relative to the second ground terminal in response to the input signal; and
a logic circuit coupled to the signal processing circuit and configured to provide one or more control signals having voltage levels relative to the second ground terminal in response to the output signal of the signal processing circuit;

wherein the signal processing circuit comprises:
a first circuit coupled between the power terminal and the first ground terminal, the first circuit being configured to receive an input signal having a voltage level relative to the first ground terminal and to provide first and second complementary digital signals in response to the input signal; and
a second circuit coupled between the power terminal and the second ground terminal, the second circuit being configured to provide a digital output signal relative to the second ground terminal in response to the first and second complementary digital signals;

wherein the one or more control signals are configured to turn on a switch device including the first and second high-voltage NMOS transistors between the first ground terminal and the second ground terminal to connect the first ground terminal to the second ground terminal, even when the second ground terminal is electrically floating relative to the first ground terminal.

2. The circuit of 1 wherein the first circuit comprises:
an input stage having an enhancement-mode NMOS transistor and a depletion-mode NMOS transistor coupled in series at a first internal node between the power terminal and the first ground terminal, a gate of the enhancement-mode NMOS transistor configured to receive the input signal;
a Schmitt trigger coupled to the input stage at the first internal node and configured to provide the first and second complementary digital signals; and
an inverter circuit coupled to an output of the Schmitt trigger to provide the second complementary digital signal.

3. The circuit of claim 1, wherein the second circuit comprises:
a first PMOS transistor and a first NMOS transistor coupled in series between the power terminal and the second ground terminal;
a second PMOS transistor and a second NMOS transistor coupled in series between the power terminal and the first ground terminal;
wherein the first and second NMOS transistors are cross-coupled at gate and drain terminals;
the first and the second PMOS transistors are configured to receive the first and second complementary digital signals from the first circuit; and a node between the second PMOS transistor and the second NMOS transistor is configured to provide the digital output signal relative to the second ground terminal.

4. The circuit of claim 1, wherein the logic circuit is configured to provide first and second control signals to turn on and off first and second high-voltage NMOS transistors in response to the output signal of the signal processing circuit.

5. The circuit of claim 1, wherein the first high-voltage NMOS transistor comprises a source and a substrate coupled to the second ground terminal, and the second high-voltage NMOS transistor comprises a source and a substrate coupled to the first ground terminal.

6. The circuit of claim 1, wherein the first ground terminal of the battery protection IC is coupled to a ground terminal of the external power source through a current-limiting resistor.

7. The circuit of claim 1, wherein the signal processing circuit is configured to receive a first control signal at a voltage level relative to the first ground terminal and, in response to the first control signal, provide a second control signal at a voltage level relative to the second ground terminal to connect the first ground terminal and the second ground terminal, when the first ground terminal and the second ground terminal are electrically disconnected from each other.

8. A control circuit, comprising:
a power terminal;
first and second ground terminals;
a signal processing circuit including:
 a first circuit coupled between the power terminal and the first ground terminal; and
 a second circuit coupled between the power terminal and the second ground terminal,
 wherein the signal processing circuit is configured to receive a first signal at a voltage level relative to the first ground terminal and, in response to the first signal, provide a second signal at a voltage level relative to the second ground terminal; and
a logic circuit coupled between the power terminal and the second ground terminal, the logic circuit being configured to receive the second signal and to provide one or more output signals at voltage levels relative to the second ground terminal in response to the second control signal;
wherein the one or more output signals are configured to turn on a switch device between the first ground terminal and the second ground terminal to connect the first ground terminal to the second ground terminal, even when the second ground terminal is electrically floating relative to the first ground terminal.

9. The control circuit of claim 8, wherein
the first circuit is configured to receive an input signal having a voltage level relative to the first ground terminal and to provide first and second complementary digital signals in response to the input signal; and
the second circuit is configured to provide a digital output signal relative to the second ground terminal in response to the first and second complementary digital signals.

10. The control circuit of claim 9, wherein the first circuit comprises:
an input stage having an enhancement-mode NMOS transistor and a depletion-mode NMOS transistor coupled in series at a first internal node between the power terminal and the first ground terminal, a gate of the enhancement-mode NMOS transistor configured to receive the input signal;
a Schmitt trigger coupled to the input stage at the first internal node; and
an inverter circuit coupled to an output of the Schmitt trigger to provide the first and second complementary digital signals.

11. The control circuit of claim 9, wherein the second circuit comprises:
a first PMOS transistor and a first NMOS transistor coupled in series between the power terminal and the second ground terminal;
a second PMOS transistor and a second NMOS transistor coupled in series between the power terminal and the second ground terminal;
wherein the first and second NMOS transistors are cross-coupled at gate and drain terminals;
the first and the second PMOS transistors are configured to receive the first and second complementary digital signals from the first circuit; and
a node between the second PMOS transistor and the second NMOS transistor is configured to provide the digital output signal relative to the second ground terminal.

12. A signal processing circuit, comprising:
a first circuit coupled between a power terminal and a first ground terminal; and
a second circuit coupled between the power terminal and a second ground terminal;
wherein the signal processing circuit is configured to receive a first signal at a voltage level relative to the first ground terminal and, in response to the first signal, provide a second signal at a voltage level relative to the second ground terminal;
wherein the second circuit comprises:
a first PMOS transistor and a first NMOS transistor coupled in series between the power terminal and the second ground terminal;
a second PMOS transistor and a second NMOS transistor coupled in series between the power terminal and the first ground terminal;
wherein the first and second NMOS transistors are cross-coupled at gate and drain terminals;
the first and the second PMOS transistors are configured to receive first and second complementary digital signals from the first circuit; and
a node between the second PMOS transistor and the second NMOS transistor is configured to provide a digital output signal relative to the second ground terminal.

13. The signal processing circuit of claim 12, wherein
the first circuit is configured to receive an input signal having a voltage level relative to the first ground terminal and to provide first and second complementary digital signals in response to the input signal; and
the second circuit is configured to provide the digital output signal relative to the second ground terminal in response to the first and second complementary digital signals.

14. The signal processing circuit of claim 13, wherein the first circuit comprises:
an input stage having an enhancement-mode NMOS transistor and a depletion-mode NMOS transistor coupled in series at a first internal node between the power terminal and the first ground terminal, a gate of the enhancement-mode NMOS transistor configured to receive the input signal;

a Schmitt trigger coupled to the input stage at the first internal node; and an inverter circuit coupled to an output of the Schmitt trigger to provide the first and second complementary digital signals.

\* \* \* \* \*